United States Patent Office 3,809,728
Patented May 7, 1974

3,809,728
CATALYST REJUVENATION
Jacob D. Kemp, El Cerrito, and Bernard F. Mulaskey, Fairfax, Calif., assignors to Chevron Research Company, San Francisco, Calif.
No Drawing. Filed Jan. 19, 1973, Ser. No. 324,934
Int. Cl. C07c 5/28
U.S. Cl. 260—683.68           6 Claims

ABSTRACT OF THE DISCLOSURE

Deactivated, supported hydrogen fluoride-antimony pentafluoride catalyst is rejuvenated by contacting the catalyst with liquid hydrogen fluoride and then with a liquid solution of HF-antimony pentafluoride.

BACKGROUND OF THE INVENTION

Field of the invention

The invention relates to rejuvenation of a supported hydrogen fluoride-antimony pentafluoride catalyst after the catalyst has been used in hydrocarbon conversion such is isomerization, alkylation, polymerization, or averaging.

The use of supported HF-antimony pentafluoride catalyst for isomerization is discussed in J. D. Kemp's earlier application, Ser. No. 268,296. The use of supported HF-antimony pentafluoride catalyst for averaging different molecular weight hydrocarbons is discussed in B. F. Mulaskey-J. D. Kemp application Ser. No. 268,297 and now abandoned.

Prior art

U.S. Pat. 3,394,202 is directed to an isomerization process using HF-antimony pentafluoride supported on a solid carrier. Preferably the carrier is made inert by pretreatment with HF. Thus, U.S. Pat. 3,394,202 states:

"Passivation of the porous solid may be effected by contact with the liquid inert material neat or dissolved in a solvent, or by contact with gaseous inert material. The starting material is adjusted to the desired particle size by sieving or grinding, and may be soaked in, e.g., an aqueous solution of aluminum fluoride and HF. The liquid is then removed by evaporation, leaving behind a thin layer of aluminum fluoride on the surface, and rendering the solid inert to hexafluoroantimonic acid. The treatment may be repeated to insure that the coating layer is of adequate thickness.

"Alternatively, an alumina-containing carrier may be treated with either gaseous or aqueous HF to coat the surface with aluminum fluoride. Or, a porous solid may be treated with a solution of antimony trifluoride in a solvent such as methanol.

"Finished catalysts are obtained by treating the inert solids with $RSbF_6$, where R is hydrogen or a saturated cyclic hydrocarbon radical having from about 4 to 12 carbons."

U.S. Pat. 3,394,202 indicates that gradual deactivation of the catalyst may occur because of the presence of impurities in the feed or because of formation of small amounts of polymerization products, and that the deactivation may be suppressed by carrying out the isomerization reaction in the presence of 1 to 3 mol percent hydrogen, based on the hydrocarbon feed.

U.S. Pat. 3,394,202 does not describe means for rejuvenating the deactivated, supported HF-antimony pentafluoride catalyst.

U.S. Pat. 3,678,120 discloses an HF-antimony pentafluoride catalyst supported on an inert carrier such as charcoal, but does not disclose means for rejuvenating the catalyst.

Canadian Pat. 794,400 is directed to the preparation of supported HF-antimony pentafluoride catalyst. According to the Canadian patent, the HF-antimony pentafluoride is deposited on a solid carrier which is substantially inert with respect to the hexafluroantimonic acid. The catalyst can be used for isomerization, alkylation or polymerization. The Canadian patent does not disclose means for rejuvenating the deactivated catalyst.

U.S. Pat. 3,369,862 is directed to a process for producing antimony trifluoride and for rejuvenating spent liquid-phase hexafluoroantimonic acid catalyst. According to U.S. Pat. 3,369,862:

"Spent catalyst, which contains liquid hydrofluoric acid as diluent, is contacted with gaseous boron trifluoride and hydrogen in a corrosion-resistant reactor under a hydrogen partial pressure of 30 to 100 atm. After an average residence time in the reactor of 5 to 15 hours, the reaction mixture is separated into gaseous constituents, liquid hydrocarbons and solid antimony trifluoride. From the gaseous constituents, which comprise a mixture of hydrogen, hydrofluoric acid, boron trifluoride and gaseous hydrocarbons, hydrofluoric acid is separated by cooling and then boron trifluoride is removed by absorption, in, for instance, anisole. Recovered boron trifluoride and the remaining gas, which consists largely of hydrogen and hydrocarbons, may be wholly or partly recycled into the process. The pulverous antimony trifluoride that has been separated is subsequently converted with chlorine into a fluoride-chloride of pentavalent antimony ($SbF_3Cl_2$), which is converted into hexafluoro-antimonic acid by means of an excess of liquid hydrofluoric acid."

Thus, U.S. Pat. 3,369,862 is directed to a complex process for rejuvenating liquid-phase HF-antimony pentafluoride catalyst.

SUMMARY OF THE INVENTION

The present invention is an improvement in a process for converting paraffinic feedstocks, wherein the paraffinic feedstocks are contacted with a catalyst bed of $HF \cdot SbF_5$ on a porous support at a temperature between $-10°$ F. and $150°$ F. The improvement according to the present invention comprises periodically rejuvenating the catalyst by contacting the catalyst with liquid hydrogen fluoride and then recontacting the catalyst support with a liquid solution of HF-antimony pentafluoride.

The present invention is advantageously applied to rejuvenating supported HF-antimony pentafluoride catalyst used for isomerizing paraffins such as $C_5$, $C_6$ and/or $C_7$ paraffins. The rejuvenation process of the present invention can also be used for rejuvenating deactivated, supported HF-antimony pentafluoride catalysts which have been used for alkylation, polymerization or averaging.

Among other factors, the present invention is based on our finding that supported HF-antimony pentafluoride catalysts can be rejuvenated by a relatively simple flushing of the catalyst bed with liquid hydrogen fluoride and then recontacting the catalyst support with a liquid solution of HF-antimony pentafluoride.

Preferably the catalyst is purged with an inert gas such as nitrogen after contacting the catalyst bed with liquid HF, but before contacting the catalyst bed with a liquid solution of HF-antimony pentafluoride. The length of the purge can be from about 1/10 hour to 24 hours.

It has also been found that supported HF-antimony pentafluoride catalyst which has become deactivated in hydrocarbon conversion services can be rejuvenated simply by flushing the catalyst bed with liquid HF-antimony pentafluoride solution. However, it is preferred to use a liquid-HF flushing step prior to using HF-antimony pentafluoride, because this procedure results in particularly effective rejuvenation of the catalyst and conserves the amount of antimony pentafluoride needed for rejuvenation.

A preferred support for the HF-antimony pentafluoride catalyst is fluorided alumina. The fluorided alumina is expensive. One of the advantages of the present invention is that the present invention is effective in conserving the amount of fluorided alumina or other support needed in conversion processes such as isomerization, because the supported HF-antimony pentafluoride catalyst can be re-used after rejuvenation in accordance with the process of the present invention.

The supported HF-antimony pentafluoride catalyst is sensitive to poisoning by aromatic compounds. A rejuvenation of the catalyst can restore catalyst activity after a plant upset wherein the catalyst is poisoned by aromatics, and thus the present invention allows avoidance of permanently losing the expensive catalyst, or replacement of the entire catalyst bed.

The supported HF-antimony pentafluoride catalyst is somewhat difficult to work with, and needs protection from moisture and air. The ability to regenerate the spent catalyst in a completely closed system is an important advantage for a hydrocarbon conversion process using a supported HF-antimony pentafluoride catalyst.

Although the present invention is not to be limited by our postulated explanation of the rejuvenation mechanism, it is believed that the reason why the procedure restores the catalyst activity is that the HF dissolves spent hexafluoroantimonic acid, tars, aromatics and other catalyst poisons, and carries them out of the reactor. The activity of the catalyst is then restored by a replenishment of the used support with the fresh HF-antimony pentafluoride.

The HF treatment of the deactivated, suported HF-antimony pentafluoride catalyst removes some antimony pentafluoride from the catalyst while removing tars. Antimony pentafluoride can be recovered from the tars washed from the catalyst bed by, for example, freezing antimony pentafluoride out of the tars to thus separate antimony pentafluoride from the tars.

EXAMPLES

An isomerization run was conducted for over 3500 hours using a supported HF-antimony pentafluoride catalyst. Reaction conditions for the isomerization run included a feed of about 40 weight percent normal pentane—60 weight percent isobutane, a reaction zone temperature of 50–80° F., a space velocity of 0.3 to 0.8 volume of feed/hour/volume of catalyst, and a pressure sufficient to maintain liquid phase. The catalyst used in the isomerization run was prepared by contacting a fluorided alumina with a solution of HF-antimony pentafluoride.

The reactor containing the catalyst was stainless steel. At the end of the isomerization run, the reactor was purged with nitrogen gas and kept in this inert atmosphere for 3 days. The rejuvenation was done by passing 30 ml. of a solution containing 57.2 g. of $SbF_5$ and 17.7 g. of HF over the deactivated catalyst. This liquid was pushed slowly through the catalyst tube with nitrogen. This took about 15–30 minutes. The first drops of material emerging from the stainless steel exit tube were black and, upon hydrolysis, left an oil on the surface of the water. The exit liquid became gradually lighter, and was a dark brown at the end of the flushing period. The entire reactor system was then purged with nitrogen for one hour, and the original isobutane-normal pentane feed was fed into the reactor again.

The activities and fouling rates of the original and the rejuvenated catalysts are compared in Tables I and II below. As can be seen from Table I, the activity of the rejuvenated catalyst was actually higher than that of the original catalyst. Table II shows that the fouling rate for the rejuvenated catalyst was less than that for the original catalyst. However, the original fouling rate of 0.025% decreased conversion per hour was considerably higher than normally obtained for a 60% isobutane-40% isopentane feedstock.

TABLE I

| Hours on stream | LHSV | Temp., °F. | Activity, percent n-hexane conversion | |
|---|---|---|---|---|
| | | | Original catalyst | Rejuvenated catalyst |
| 500 | 0.30 | 80 | 73.5 | |
| 800 | 0.80 | 80 | 55 | |
| 200 | 0.30 | 65 | | 81.5 |
| 200 | 0.40 | 65 | | 75 |
| ∼200 | 0.80 | ∼80 | | 68 |

TABLE II

| | Original catalyst | Rejuvenated catalyst |
|---|---|---|
| Hours on stream | 200 | 350 |
| LHSV | 0.8 | ∼0.8 |
| Fouling rate at 80° F., decrease in percent conversion per hour | 0.25 | (¹) |

¹ Much less than 0.25.

In the above example, the rejuvenation was effected using an HF-antimony pentafluoride one-step flushing procedure. In subsequent runs it was found that particularly effective rejuvenation was achieved by flushing the catalyst bed first with liquid hydrogen fluoride and then contacting the catalyst with a liquid solution of HF-antimony pentafluoride. In the laboratory runs a nitrogen purge was used between the liquid-HF flushing step and the HF-antimony pentafluoride contacting step.

Four successful rejuvenations were carried out for a supported HF-antimony pentafluoride catalyst using the preferred rejuvenation procedure. The catalyst used in the sequential runs was prepared by contacting a fluorided alumina with a solution of HF-antimony pentafluoride.

The first run with the catalyst can be designated Run 177. The feedstock for this run was 40% normal hexane and 60% isobutane. The run lasted for 1198 hours. Temperatures used during the run ranged from about 80° to 120° F. The higher temperatures were used in order to more rapidly foul the catalyst.

The catalyst was rejuvenated by passing liquid hydrogen fluoride through the catalyst bed. Then the catalyst bed was purged with nitrogen gas, and finally HF-antimony pentafluoride was passed through the bed to obtain the rejuvenated catalyst.

Averaging Run 178 was then begun with the catalyst, using a feedstock of isobutane and two or more normal paraffins, such as $nC_7$ through $nC_{12}$. Temperatures used in averaging Run 178 ranged from 50° to 80° F. The run lasted for 1482 hours and the catalyst exhibited a low fouling rate and a high activity.

After Run 178, the catalyst was rejuvenated, using substantially the same procedure as used after Run 177.

Then isomerization Run 179 was commenced, using a feedstock of about 40% normal hexane/60% isobutane. The normal-hexane feed was isomerized at high conversion levels, using the regenerated catalyst, and the run was continued for 720 hours. Original Run 177 is contrasted in Table III to Run 179, using the catalyst which had been rejuvenated twice.

As can be seen in Table III, the rejuvenated catalyst exhibited excellent activity and very low fouling rate. The fouling rate in Table III is defined in terms of the percent drop in conversion of normal hexane to isohexanes per hour. As can be seen from the data presented in Table III, the rejuvenated catalyst had approximately the same activity as the original catalyst and approximately the same fouling rate. The fouling rates for both the original and the rejuvenated catalyst were very low, so that a precise number for fouling rate is difficult to obtain.

TABLE III

|  | Original catalyst | Rejuvenated catalyst |
|---|---|---|
| Run number | 177 | 179 |
| LHSV (over all) | 0.8 | 1.2 |
| Temperature, °F | 80 | 80 |
| Hours on stream | 200 | 350 |
| Activity, percent conversion of normal hexane | 94 | 93 |
| Fouling rate, decrease in percent conversion/hour | <0.5 | <0.5 |

After completion of Run 179, the catalyst was rejuvenated, using substantially the same procedure as was used to rejuvenate the catalyst after Run 177.

Then Run 180 was commenced, using the catalyst which had been rejuvenated after Runs 177, 178 and 179. Run 180 was again an isomerization run, with a feedstock of about 40% normal hexane and 60% isobutane. The run was continued in excess of 500 hours. The catalyst exhibited excellent activity and very low fouling rate, comparable to the original catalyst used in Run 177. The thrice-rejuvenated catalyst produced a product of about 80 octane from an initial feed having an octane of about 38. Operating conditions to produce the 80-octane product included a reaction zone temperature of 80° F. and a liquid hourly space velocity of 1.2. The liquid hourly space velocity is an over-all space velocity for the total hydrocarbon feed, which in this case was normal hexane and isobutane.

The catalyst was rejuvenated after Run 180 and was used for isomerization Run 181.

Table IV shows the original activity of the catalyst expressed as a reaction rate, assuming that the reaction is first order. It also shows the maximum activity of the catalyst after four rejuvenations. It can be seen that the catalyst activity is restored to fresh catalyst activity. The activity (rate constant) calculations given in Table IV were made based on the conversion of n-hexane to different products. The respective run-number activity checks were made using a feed of 60 volume percent isobutane, 40 volume percent n-hexane, and a temperature of 80° F.

TABLE IV

| Run No.: | Rate Constant sec.$^{-1} \times 10^{-4}$ |
|---|---|
| 177 | 9.4 |
| 178 | 8.7 |
| 179 | 11.9 |
| 180 | 8.6 |
| 181 | 8.5 |

What is claimed is:

1. In a process for converting a paraffin feed by contacting the feed with a catalyst bed of HF-antimony pentafluoride on a porous support, at a temperature between −10° F. and 150° F., the improvement which comprises rejuvenating the catalyst by contacting the catalyst with liquid hydrogen fluoride, and then contacting the catalyst with a liquid solution of HF-antimony pentafluoride.

2. A process in accordance with claim 1, wherein the support is fluorided alumina.

3. A process in accordance with claim 1, wherein the feed comprises $C_5$, $C_6$ and $C_7$ normal paraffins, and the feed is isomerized.

4. A process in accordance with claim 1, wherein after the catalyst is contacted with the liquid hydrogen fluoride, hydrogen fluoride is removed from the catalyst bed before contacting the catalyst with the liquid solution of HF-antimony pentafluoride.

5. A process in accordance with claim 4, wherein the catalyst bed is purged with an inert gas after contacting the bed with liquid HF, but before contacting the bed with a liquid solution of HF-antimony pentafluoride.

6. In a process for converting a paraffin feed by contacting the feed with a catalyst bed of HF·SbF$_5$ on a porous support at a temperature between −10° F. and 150° F., the improvement which comprises periodically rejuvenating the catalyst by passing a solution comprising HF-antimony pentafluoride through the bed of catalyst.

References Cited
UNITED STATES PATENTS

| 3,201,494 | 8/1965 | Oelderik et al. | 260—683.68 |
| 3,369,862 | 2/1968 | Oelderik et al. | 252—415 |
| 3,394,202 | 7/1968 | Oelderik | 260—683.68 |
| 3,678,120 | 7/1972 | Bloch | 260—683.47 |

CURTIS R. DAVIS, Primary Examiner

U.S. Cl. X.R.

260—683.47; 252—413, 415